April 20, 1965   R. H. ANDRESEN   3,179,425
ROTARY SEAL EMPLOYING A FLEXIBLE SLEEVE
Filed Sept. 27, 1961
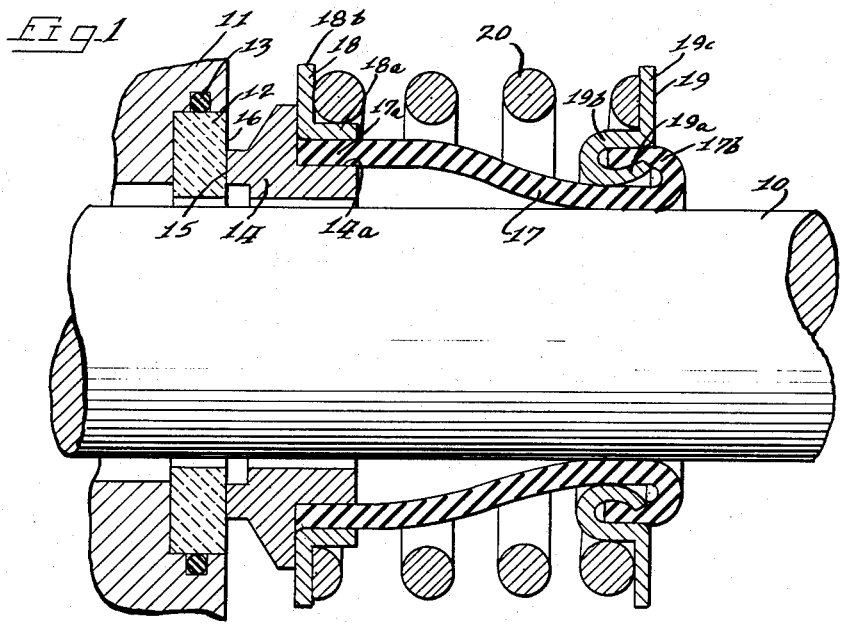
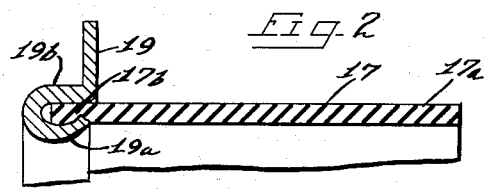
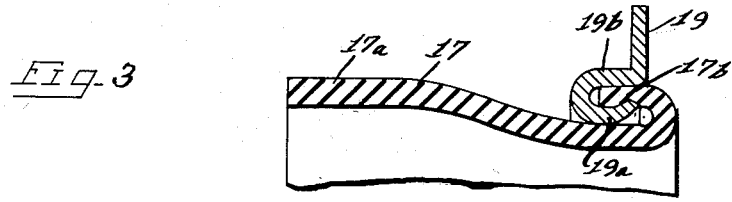
INVENTOR.
Raymond H. Andresen
BY
ATTORNEYS United States Patent Office 3,179,425
Patented Apr. 20, 1965

3,179,425
ROTARY SEAL EMPLOYING A FLEXIBLE SLEEVE
Raymond H. Andresen, Barrington, Ill., assignor to Gits Bros. Mfg. Co., Chicago, Ill., a corporation of Illinois
Filed Sept. 27, 1961, Ser. No. 141,136
5 Claims. (Cl. 277—89)

The present invention relates to an improved rotary seal assembly.

More particularly the invention contemplates the provision of a rotary sealing assembly of simplified construction for use in an environment such as a water pump shaft. In rotary seals wherein annular sealing faces are held together in rubbing contact uneven forces often result in uneven pressures between the sealing faces to cause uneven wear. This will result in a slight wobble and will frequently result in leakage. A more serious effect is that foreign materials are allowed to get between the faces to cause rapid wear and damage of the sealing faces.

An object of the present invention is to provide an improved rotary seal assembly wherein the sealing faces are held together by forces which allow uniform conformation between the mating faces and allow the rotating sealing ring to shift so that it will not tend to hang up on one side and permit leakage or the entry of foreign materials between the sealing faces.

A further object of the invention is to provide a simplified rotary seal employing a flexible sleeve or boot of simplified construction and wherein the attachments between the sleeve and its mating elements are simplified.

A further object of the invention is to provide a rotary seal using a tubular sleeve which can be cut from the end of a supply stock of cylindrical material of uniform diameter and wherein the sleeve is secured to its mating elements by an improved method.

A further object of the invention is to provide an improved rotary seal wherein the spring and the sleeve of the assembly are carried with the rotating shaft and the rotating sealing ring is driven in rotation by the spring.

A still further object of the invention is to provide a rotary seal wherein the seal face can be located close to the shaft and the contained fluid pressures will not result in high PV factors (pressure × velocity).

A feature of the invention is the provision of a rotary seal assembly with a stationary sealing member having an annular axially facing sealing face and a rotary sealing member with a radial annular sealing face in sealing engagement with the face of the stationary member and a flexible sleeve formed of material of uniform diameter having one end attached to the rotary member and the other end turned outwardly and axially and secured to a holding ring which clamps the sleeve to a shaft, and further having a spring connected with an interference fit to the holding ring and to the rotary sealing member for driving the rotary sealing member in rotation.

Other objects, advantages and features will become more apparent with the teaching of the principles of the invention in connection with the disclosure of the preferred embodiment thereof in the specification, claims and drawings, in which:

FIGURE 1 is a vertical sectional view taken through the axis of a rotary seal assembly shown in position on a shaft;

FIGURE 2 is a fragmentary sectional view showing a step in the method of assembling the sleeve of the seal; and FIGURE 3 is a fragmentary sectional view showing a successive step in assembling the sleeve.

As shown on the drawings:

FIGURE 1 shows a shaft 10 extending through an opening in a housing 11 which may be part of a pump or similar structure with a seal assembly accommodating passage of the shaft through the housing and preventing the escape of fluid.

The seal assembly includes a non-rotatable sealing ring 12 supported in a recess in the housing 11 with an O-ring 13 in a groove in the housing around the seal. The stationary sealing ring 12 may be formed of a ceramic material which is hard and has some porosity and is well suited to long wear.

In sealing engagement with the stationary sealing ring 12 is a rotating sealing ring 14 having an annular radial sealing face 15 in sealing engagement with an annular radial axially facing sealing face 16 on the stationary ring 12. The rotatable ring may be formed of a material such as carbon or it may have a pre-lubricated phenolic resin plastic face. Various suitable materials may be employed for the sealing rings dependent upon the fluids being sealed, the speeds of operation and the temperatures involved. It is to be noted that the rotatable sealing ring 14 has a small diameter and is mounted close to the shaft so that the sealing faces 15 and 16 can be of small diameter for low PV factors which are an indication of long life of the seal.

The rotatable sealing ring 14 is held in sealing engagement with the stationary sealing ring 12 by being supported in a floating sealing relationship to the stationary ring which insures intimate sealing contact even though the shaft may run out. The support for the rotating sealing ring 14 avoids structures heretofore available which drive the ring through a torque applied through notches and projections. The notches and interlocking projections create an area of interference with face contact under certain operating conditions which can induce leakage or admit foreign particles between the sealing surfaces inevitably resulting in premature seal failure.

A cylindrical sleeve 17 has its forward end connected to the sealing ring 14 by resting on a radially outwardly facing shoulder 14a on the ring. The sleeve is clamped against the shoulder by an annular ferrule 18.

At the other end 17b, the end of the sleeve is turned outwardly and axially outside of the sleeve and is clamped in a ferrule or holding ring 19. The holding ring 19 has an axially forwardly extending portion 19b which turns downwardly in a flange 19a that clamps against the end 17b of the sleeve to firmly grip it. The inner diameter of the holding ring is such that the sleeve is held grippingly against the outer surface of the shaft 10. For installation the assembly including the rotatable sealing ring 14, sleeve 17, holding ring 19 and the associated parts are moved axially over the end of the shaft 10 until the sealing face 15 is against the sealing face 16 and the spring 20 is slightly compressed, and the frictional contact between the sleeve and the shaft 10 will hold the sealing assembly in this relationship.

The rotatable sealing ring is driven in rotation by a coil compression spring 20 which is coaxial with the shaft 10. The spring 20 is of a diameter so that it has an interference fit with the ferrule 18 and the holding ring 19 at each end so that the holding ring will drive the rotatable sealing ring 14 in rotation through the spring 20. The rear end of the spring fits with an interference fit over the axially projecting portion 19b of the holding ring 19 and the other end of the spring fits over an axial flange 18a of the ferrule 18. The spring of course also urges the sealing ring 14 axially and the ends of the spring respectively abut radial flanges 19c and 18b of the holding ring 19 and ferrule 18. A portion of the rotational driving torque for driving the sealing ring 14 is of course derived from the sleeve 17. Thus the spring 20 supports the ring 14 radially in a coaxial position and yet permits floating surface conformation, providing a yieldable rotational drive.

The sleeve 17 is formed of rubber or other suitable elastomeric material capable of withstanding the temperatures of the fluids sealed. As above stated, the instant seal is well suited for sealing operation in a water pump and may handle water at various temperatures, or may handle other fluids.

The method of assembling the sleeve to the other associated parts is illustrated in FIGURES 2 and 3. The sleeve 17 is well adapted to being formed from a material of uniform diameter and a continuous length of sleeve material can be provided with each sealing sleeve successively cut from the end of a supply length. The sleeve is first positioned as shown in FIGURE 2 with the flange 19a bent or crimped into position to firmly grip the sleeve end 17b therein. The end 17a is then drawn through the center of the holding ring 19 in the manner shown in FIGURE 3. Inasmuch as the sleeve is of uniform diameter the portion within the holding ring 19 will be slightly compressed but the end portions will be at normal diameter and this provides an advantageous relationship for sealingly holding the sleeve against the outer surface of the shaft 10. The end 17a of the sleeve is then positioned over the shoulder 14a of the ring 14 and the ferrule 18 placed in position. For convenience the ferrule 18 may be of one piece and the spring 20 and ferrule 18 may be slid over the sleeve in the position of FIGURE 3 before it is placed over the shoulder 14a of the sealing ring 14.

It will be noted that the sealing ring is carried in a floating manner into sealing contact with the stationary ring 12 and no upsetting forces are applied which would tilt or cock the ring 14 and permit foreign materials to enter between the sealing surfaces 15 and 16.

The ferrule 18 and the holding ring 19 may be formed of various suitable materials and brass is well adapted for use for these elements.

Thus it will be seen that I have provided an improved rotating seal assembly which meets the objectives and advantages above set forth. The seal is designed to afford maximum economies in production and the parts are well adapted for automated assembly and parts manufacture.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A rotary seal assembly comprising a stationary sealing member having an annular axially facing sealing face, a rotary sealing member having a radial annular sealing face in sealing engagement with the face of said stationary member, a cylindrical sleeve formed of a resilient material of initially uniform diameter with one end secured to the rotary sealing member, and a holding ring for the other end of the sleeve with said other end turned outwardly and being under stress and extending in a reversed direction outwardly of the sleeve and secured to the holding ring.

2. A rotary seal assembly comprising a stationary sealing member having an annular axially facing sealing face, a rotary sealing member having a radial annular sealing face in sealing engagement with the face of said stationary member, a flexible sleeve having one end sealingly attached to said rotary member, a holding ring with the other end of said sleeve extending through the ring and turned outwardly and being under stress and secured to the holding ring and the ring having a diameter to frictionally clamp the sleeve to a shaft, and spring means holding the rotary member in sealing contact with the stationary member.

3. A support and drive for a rotary sealing ring having a radial annular face for engagement with the annular radial face of a stationary sealing member comprising an elongate tubular sleeve of material of uniform thickness and the sleeve being of initially uniform diameter and being adapted for attachment at the end to the sealing ring, a holding ring surrounding the other end of the sleeve for clamping it to the outer surface of a rotating shaft member, said other end of the sleeve turned outwardly inside out so as to be stressed with the inverted outwardly turned end secured to said holding ring, and spring means for urging the rotary sealing ring against the stationary sealing member.

4. A rotary seal assembly comprising a stationary sealing member having an annular axially facing sealing face, a rotary sealing member having radial annular sealing face in sealing engagement with the face of said stationary member, a flexible sleeve of initially uniform diameter having one end attached to said rotary member and the other end adapted to be sealed to a rotating shaft member, a holding ring surrounding said other end of the sleeve for clamping it to a rotating shaft, said sleeve turned inside out and under stress at said one end with the inverted end secured to the holding ring, a ferrule surrounding the one end of the sleeve and clamping it to the rotary sealing member, and a coil compression spring having an inner diameter so that the ends respectively engage the ferrule and the holding ring with an interference fit to drive the sealing member in rotation and hold it to freely conform to the face of the stationary sealing member.

5. A support and drive for a rotary sealing ring having a radial annular face for engagement with the annular radial face of a stationary sealing member comprising a tubular sleeve of resilient material of initially uniform diameter adapted for attachment at one end to the sealing ring, a holding ring surrounding the other end of the sleeve for clamping it to the outer surface of a rotating shaft member, said tube turned inside out at said other end and being under stress with the inverted end secured to the ring, and an annular compression spring having one end non-rotatably connected to said holding ring and the other end adapted for non-rotatable connection to said sealing ring for freely holding the sealing ring face in radial sealing conformation with the stationary sealing face and for driving the ring in rotation.

References Cited by the Examiner

UNITED STATES PATENTS

| | | | |
|---|---|---|---|
| 2,294,105 | 8/42 | Wallgren | 277—88 |
| 2,395,095 | 2/46 | Brady | 277—89 |
| 2,752,176 | 6/56 | Alying | 277—41 |
| 2,914,845 | 12/59 | Crites | 29—450 |
| 2,924,007 | 2/60 | Wrightfield | 29—450 |
| 3,001,807 | 9/61 | Amirault et al. | 277—89 |
| 3,020,052 | 2/62 | Gits | 277—89 |
| 3,075,780 | 1/63 | Mayer | 277—89 |
| 3,117,793 | 1/64 | Hauser et al. | 277—89 |

FOREIGN PATENTS 648,814   1/51   Great Britain.

LEWIS J. LENNY, *Primary Examiner.*

WILLIAM FELDMAN, SAMUEL ROTHBERG, EDWARD V. BENHAM, *Examiners.*